UNITED STATES PATENT OFFICE.

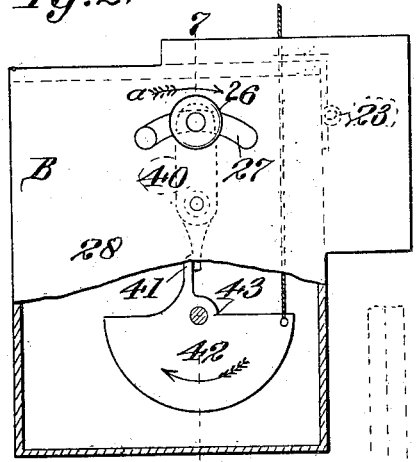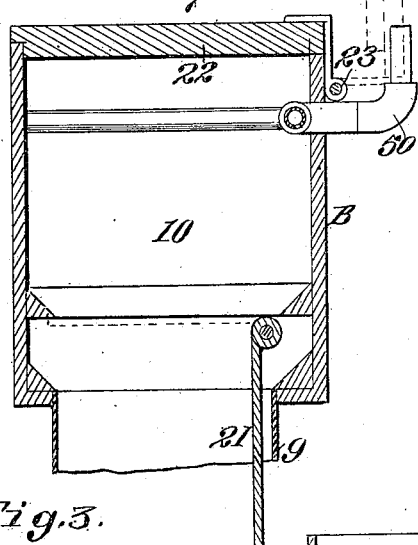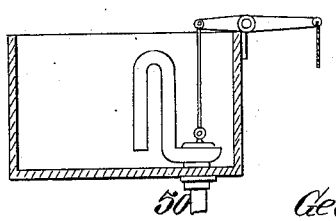

GEORGE C. CHEEK, OF SACRAMENTO, CALIFORNIA, ASSIGNOR OF ONE-FOURTH TO OMER E. CHEEK AND ONE-FOURTH TO RODNEY J. MORRISSEY, BOTH OF SACRAMENTO, CALIFORNIA.

GARBAGE COLLECTOR AND RECEIVER.

1,279,258.     Specification of Letters Patent.     Patented Sept. 17, 1918.

Application filed January 31, 1918. Serial No. 214,583.

*To all whom it may concern:*

Be it known that I, GEORGE C. CHEEK, a citizen of the United States, residing at Sacramento, in the county of Sacramento and State of California, have invented new and useful Improvements in Garbage Collectors and Receivers, of which the following is a specification.

This invention relates to a garbage receiving and collecting system.

One of the objects of the present invention is to provide a simple, cheaply manufactured, easily installed receiving and collecting system for garbage which is particularly adapted for installation in apartment houses and the like, which consists of a receiver having a pair of trap doors and a mechanism for operating said doors, so that one remains closed while the other is open, or vice versa. Another object of the invention is to provide means for flushing the receivers with water. Further objects will hereinafter appear.

The invention consists of the parts and the construction and combination of parts as hereinafter more fully described and claimed, having reference to the accompanying drawings, in which—

Figure 1 is a vertical section on the line 4—4 of Fig. 4.

Fig. 2 is a side elevation, partly in section, taken on the line 5—5 of Fig. 4.

Fig. 3 is a cross section, taken on the line 6—6 of Fig. 4.

Fig. 4 is a cross section, taken on the line 7—7 of Fig. 2.

Fig. 5 is a cross section of the flushing tank.

The receiver 10 which is placed in the kitchen consists of a box-like structure B, in which is formed a receiving chamber 10. A trap door 21 which is normally raised serves as a bottom for this chamber while the cover 22, pivotally attached to the receiver as at 23, forms a closure for the same. Means have been provided for opening the cover 22 without affecting the position of the lower trap door 21, said means being also adapted to open the trap door 21 when the main cover 22 is closed. This is accomplished in the following manner: Pivotally mounted on the side of the receiver, as at 24, is a lever 25. Formed on the upper end of said lever is a handle 26 which projects through a slot 27 formed in a cover plate 28. Also formed on the upper end of the lever and right angularly positioned with relation to same is a slotted extension 28 which normally engages a crank arm 29 attached to the hinge 23 of the cover.

Formed on the hinge of the trap door 21 is a second crank arm 30. This crank arm engages a slot 31 formed in the lever which is pivotally attached to the side of the receiver, as at 32. This lever is also provided with a second slotted portion 33 in which travels a pin 34 secured on the lower end of the lever 25.

If it is desired to open the cover 22 to deposit garbage in the receiver, it is only necessary to rock the lever 25 by means of the handle 26 in the direction of arrow *a* (see Fig. 2) or from the full line position shown in Fig. 1 to the position where the pin 34 reaches the extreme end of the slot 33. This movement of the lever 25 causes the slotted extension 28 to engage the crank arm 29 and swing it to the dotted line position $29^a$, thus lifting the cover or opening same. The lower slotted lever which is pivotally mounted at 32 remains stationary during this movement of the lever 25 as the pin 34 travels freely in the direction of the arrow (see Fig. 1) to the end of the slot 33 without imparting movement to the lever. If it is desired to close the cover it is only necessary to rock the lever 25 back to the position shown in Figs. 1 and 2. Garbage deposited in the receiver rests upon the trap door 21 which cannot open until the lever 25 is moved to the dotted line position shown at $25^a$ (see Fig. 1). This movement causes the pin 34 to engage the opposite end of the slot 33, thus causing said lever to assume the dotted line position shown at $33^a$. This movement of the lever causes the slot 31 to swing the crank arm 30 to the dotted line position $30^a$ and as the crank arm is secured to the hinge of the trap door it can readily be seen that it will be swung in a downward direction to the position shown at 21 in Fig. 3. Any garbage deposited in the receiver will thus drop down through the chute 9 into the main receptacle (not shown). Swinging of the lever 25 back to normal position causes the trap door to move upward and close, thus serving as a double lock against rising fumes which might otherwise enter the kitchen; that is, the trap door 21 first forms a closure against escaping fumes.

Moving in unison with the main lever 25 is a second lever 40. This lever engages a projection 41 formed on a weight 42 which is pivotally mounted, as at 43, on the cover plate 28. Movement of the lever 25 and the lever 40 in the direction of arrow $a$ merely causes the weight to rock in a direction opposite to the arrow shown in Fig. 2, thus permitting the lower end of lever 40 to pass over the projection 41. Movement of the levers 25 and 40 in a direction opposite to arrow $a$ will cause the lower end of the lever 40 to engage the projection 41 and rock the weight in the direction of the arrow shown.

A cord attached to the weight which is connected with a valve in the flush tank, such as shown in Fig. 8, will, during this movement, lift the valve and permit the water in the tank to drain through a pipe 50 and discharge into the receiver. A perforated pipe 51 within the receiver directs the water in the form of a spray against the sides and ends of the chamber 10, thus flushing and cleaning the receiver. This flushing action takes place every time the trap door 21 is about to be closed, thus insuring a flushing or cleaning of the receiver chamber 10 every time it is emptied. The water used for flushing purposes passes down through the chute 9 into the main receiver (not shown) and it is here permitted to drain away from the garbage.

Having thus described my invention, what I claim and desire to secure by Letters Patent is—

1. In a garbage collecting device, a receiver, a movable bottom for the receiver, a movable cover for the receiver, means positively connected to the bottom and positively connected to the cover for operating each, and means whereby when said operating means is moved in one direction the cover will be operated to the exclusion of the bottom and when the operating means is moved in a second direction the bottom will be operated to the exclusion of the cover.

2. In a garbage collecting device, a receiver, a movable bottom for the receiver, a movable cover for the receiver, a pivoted operating device connected to the cover, a pivoted operating device for the bottom, and means positively connecting said devices, whereby when the cover operating device is moved in one direction the cover only will be operated and when said cover operating device is moved in a second direction the operating device of the bottom will be actuated to the exclusion of movement of the cover.

3. In a garbage collecting device, a receiver, a movable bottom for the receiver, a flushing device, means for operating the bottom, means operated by said bottom operating means for actuating the flushing device when said bottom operating device is moved in one direction, a cover, and means actuated by said bottom operating device, upon a second movement of the latter for operating the cover to the exclusion of operation of the flushing device.

4. In a garbage collecting device, a receiver, a movable bottom for the receiver, a movable cover for the receiver, operating means positively connected to the bottom and positively connected to the cover for operating each, means to mount said operating means at a point spaced from the cover, and means whereby when said operating means is moved in one direction the cover will be operated to the exclusion of the bottom and when the operating means is moved in a second direction the bottom will be operated to the exclusion of the cover.

5. In a garbage collecting device, a receiver, a movable bottom for the receiver, a movable cover for the receiver, a bell crank lever pivoted to the receiver, and pin and slot connections between the ends of the lever and the bottom and cover respectively whereby when the lever is rocked in one direction the cover will be operated to the exclusion of the bottom and when the lever is rocked in the opposite direction the bottom will be operated to the exclusion of the cover.

6. In a garbage collecting device, a receiver, a movable bottom for the receiver, a movable cover for the receiver, a bell crank lever pivoted to the receiver, a pivoted member, a connection between said member and the bottom for operating the latter, and lost-motion connections between the ends of the lever and the cover and said member respectively whereby when the lever is rocked in one direction the cover will be operated to the exclusion of the bottom and when the lever is rocked in the opposite direction the bottom will be operated to the exclusion of the cover.

7. In a garbage collecting device, a receiver, a movable bottom for the receiver, a movable cover for the receiver, operating means positively connected to the bottom and positively connected to the cover for operating each, means to mount said operating means at a point spaced from the cover, means whereby when said operating means is moved in one direction the cover will be operated to the exclusion of the bottom and when the operating means is moved in a second direction the bottom will be operated to the exclusion of the cover, a flushing device and means connected to said operating means whereby to actuate the flushing device only when said operating means is moved in said second direction.

8. In a garbage collecting device, a receiver, a movable bottom for the receiver, a cover for the receiver, flushing means, a weighted pivoted means to actuate the flushing means, when moved in one direction, operating means to operate the bottom and the cover either to the exclusion of the other, and means operated by said operating means for actuating said pivoted means only in said one direction and for allowing the flushing device to remain quiescent when the operating means is moved to open the cover.

In testimony whereof I have hereunto set my hand in the presence of two subscribing witnesses.

GEORGE C. CHEEK.

Witnesses:
W. J. ROONEY,
G. HICKS.

Copies of this patent may be obtained for five cents each, by addressing the "Commissioner of Patents, Washington, D. C."